(12) United States Patent
Kim et al.

(10) Patent No.: US 7,180,846 B2
(45) Date of Patent: Feb. 20, 2007

(54) PHASE COMPENSATOR AND COMPATIBLE OPTICAL PICKUP USING THE PHASE COMPENSATOR

(75) Inventors: Tae-kyung Kim, Seoul (KR);
Young-man Ahn, Gyeonggi-do (KR);
Hae-jung Suh, Gyeonggi-do (KR);
Jin-kyung Lee, Gyeonggi-do (KR);
Jong-bae Kim, Seoul (KR);
Chong-sam Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 593 days.

(21) Appl. No.: 10/284,415

(22) Filed: Oct. 31, 2002

(65) Prior Publication Data
US 2003/0095334 A1    May 22, 2003

(30) Foreign Application Priority Data
Oct. 31, 2001    (KR)    .............................. 2001-67620

(51) Int. Cl.
*G02B 5/18* (2006.01)
(52) U.S. Cl. .............................. 369/112.17; 369/112.22
(58) Field of Classification Search .................... None
See application file for complete search history.

(56) References Cited

U.S. PATENT DOCUMENTS 6,345,034 B1 *  2/2002  Kim ........................ 369/275.5
6,430,137 B1 *  8/2002  Saimi et al. .............. 369/112.1
6,442,124 B1 *  8/2002  Chung et al. .......... 369/112.07
6,853,614 B2 *  2/2005  Kim et al. ............. 369/112.01
6,888,787 B2 *  5/2005  Saitoh et al. .......... 369/112.01
2004/0257958 A1 * 12/2004  Kimura et al. ......... 369/112.03
2005/0047311 A1 *  3/2005  Sato et al. ............. 369/112.02

FOREIGN PATENT DOCUMENTS

JP    6-82725    3/1994

\* cited by examiner

*Primary Examiner*—William Korzuch
*Assistant Examiner*—Joseph Haley
(74) *Attorney, Agent, or Firm*—Stein, McEwen & Bui, LLP

(57) ABSTRACT

A compatible optical pickup for recording and/or reproducing information on/from multiple kinds of optical discs having different thicknesses by selectively using source lights of respective different wavelengths corresponding to a kind of disc and using a common objective lens. At least one phase compensator, which compensates a phase of a light having a particular wavelength to correct for spherical aberration due to a thickness difference between the kinds of optical discs and/or chromatic aberration due to a wavelength difference between the required source lights, is positioned between the source lights and an entrance pupil of the objective lens. Each phase compensator compensates light of at least one wavelength and passes light of at least one other wavelength without significant relative phase alteration. By using two phase compensators, the optical pickup may be made compatible with at least three kinds of optical discs.

36 Claims, 10 Drawing Sheets

PHASE COMPENSATOR AND COMPATIBLE OPTICAL PICKUP USING THE PHASE COMPENSATOR

CROSS-REFERENCE TO RELATED APPLICATIONS

This application claims the benefit of Korean Application No. 2001-67620 filed Oct. 31, 2001, in the Korean Intellectual Property Office, the disclosure of which is incorporated herein by reference.

BACKGROUND OF THE INVENTION

1. Field of the Invention

The present invention relates to a phase compensator for compensating for a phase of light having a particular wavelength among a plurality of wavelengths of light and a compatible optical pickup using the phase compensator.

2. Description of the Related Art

In an optical recording and/or reproduction system for recording information on and/or reproducing recorded information from an optical disc using a light spot focused by an objective lens, the recording density is determined by a size of the light spot. The size of the light spot (S) is proportional to the wavelength of light ($\lambda$) and is inversely proportional to a numerical aperture (NA) of the objective lens, as shown by expression (1) below:

$$S \propto \lambda/NA \quad (1)$$

Accordingly, to reduce the size of the light spot being focused on the optical disc for a higher recording density, a short-wavelength light source, such as a blue-violet laser, is adopted along with an objective lens having an NA of 0.6 or greater. Denoting a tilt angle of the optical disc as $\theta$, a refractive index of the optical disc as n, a thickness of the optical disc as d, and a numerical aperture of the objective lens as NA, coma aberration $W_{31}$ occurring due to tilting of the optical disc is expressed by expression (2) below:

$$W_{31} = -\frac{d}{2} \cdot \frac{n^2(n^2-1)\sin\theta\cos\theta}{(n^2-\sin^2\theta)^{\frac{5}{2}}} NA^3 \quad (2)$$

In expression (2), the refractive index n and the thickness d of the optical disc refer to those of an optical medium, i.e., an optical disc substrate, positioned between a light incident surface and an information recording surface of the optical recording medium.

In consideration of expression (2) above, to ensure tolerance with respect to the tilt of an optical disc, there is a need to reduce the thickness of the optical disc as the NA of the objective lens is increased for a higher density. The thickness d of the optical disc is reduced from 1.2 mm for CDs to 0.6 mm for DVDs. Also, there is a high possibility that the thickness d of next generation DVDs (so-called high-definition (HD)-DVDs) will be determined to be 0.1 mm. The NA of the objective lens was increased from 0.45 for CDs to 0.6 for DVDs and an NA of about 0.85 for HD-DVDs is expected. HD-DVDs are highly likely to adopt a blue-violet light source to accomplish the desired recording density. In developing a new standard for optical discs, compatibility with existing optical discs is an important consideration.

For example, in conventional once-recordable optical discs such as a DVD-R and CD-R, reflectivity greatly decreases depending on the wavelength of light. Accordingly, a light source having a wavelength of 650 nm is used for the DVD-R and a light source having a wavelength of 780 nm is used for the CD-R. Therefore, in view of compatibility with the DVD-R and CD-R, three light sources having different wavelengths are required for an optical pickup for HD-DVDs.

A compatible optical pickup using a plurality of light sources of different wavelengths may employ a single objective lens, in view of advantages in size, assembly, and cost. While recording and/or reproducing information using a single objective lens compatible for optical discs of different thicknesses, spherical aberration occurs due to the difference in thickness of the optical discs. Therefore, an aberration compensator is necessary for the compatible optical pickup using the single objective lens to allow satisfactory information recording and/or reproduction with respect to the three different optical discs.

SUMMARY OF THE INVENTION

To solve the above-described and other problems, an object of the present invention is to provide a phase compensator which compensates for a phase of light having a predetermined wavelength of incident light and passes light having other wavelengths without phase alteration and a compatible optical pickup using the phase compensator, in order to record information on and/or reproduce information from more than one kind of optical disc.

Additional objects and advantages of the invention will be set forth in part in the description which follows, and, in part, will be obvious from the description, or may be learned by practice of the invention.

In one aspect, the present invention provides a phase comprising a plurality of phase delay regions and satisfying expressions:

$$(a-b) = m\lambda_A, \text{ and}$$

$$(a'-b') = n\lambda_B,$$

where $\lambda_A$ and $\lambda_B$, denote different wavelengths of incident light, a and a' denote an amount the phase of the light is delayed by one phase delay region for the wavelengths $\lambda_A$ and $\lambda_B$, respectively, b and b' denote an amount the phase is delayed by another adjacent phase delay region for the wavelengths $\lambda_A$ and $\lambda_B$, respectively, and m and n are values in a range including (j−0.07) and (j+0.07), where j is an integer.

The phase compensator may comprise a plurality of stepped patterns corresponding to the plurality of phase delay regions, wherein a step size s of each of the stepped patterns satisfies expressions:

$$(n1-n0)s = m\lambda_A, \text{ and}$$

$$(n3-n0'')s = n\lambda_B,$$

where n1 and n3 denote the refractive indices of an optical medium of the phase compensator, respectively, with respect to the wavelengths $\lambda 1$ and $\lambda 3$, and n0 and n0'' denote the refractive indices of an air region of the phase compensator, respectively, with respect to the wavelengths $\lambda_A$ and $\lambda_B$.

In another aspect, the present invention provides a compatible optical pickup comprising: a light unit which emits first, second, and third lights of different wavelengths $\lambda 1$, $\lambda 2$, and $\lambda 3$ suitable for recording information on and/or reproducing information from first, second, and third optical discs having different formats, respectively, and receives and detects light reflected from the respective first, second, and third optical discs; an objective lens which focuses the first, second, and third lights incident from the light unit to form a light spot on the respective first, second, and third optical discs; first and second phase compensators which are arranged at the entrance pupil of the objective lens and induce a phase difference variation with respect to the respective second and third lights, and each of which comprises a plurality of phase delay regions, and the first phase compensator satisfies expressions:

$(a-b)=m\lambda1$, and $(a'-b')=n\lambda3$, where a and a' denote the amount the phase is delayed by one phase delay region of the first phase compensator for the first light of the wavelength $\lambda1$ and the third light of the wavelength $\lambda3$, respectively, b and b' denote the amount the phase is delayed by another adjacent phase delay region of the first phase compensator for the first light of the wavelength $\lambda1$ and the third light of the wavelength $\lambda3$, respectively, and m and n are values in a range including (j−0.07) and (j+0.07), where j is an integer, and the second phase compensator satisfies expressions:

$(c-d)=p\lambda1$, and $(c'-d')=q\lambda2$, where c and c' denote the amount the phase is delayed by one phase delay region of the second phase compensator for the first light of the wavelength $\lambda1$ and the second light of the wavelength $\lambda2$, respectively, d and d' denote the amount the phase is delayed by another adjacent phase delay region of the second phase compensator for the first light of the wavelength $\lambda1$ and the second light of the wavelength $\lambda2$ respectively, and p and q denote values in a range including (j−0.07) and (j+0.07), where j is an integer.

In the compatible optical pickup according to the present invention, the first phase compensator may comprise a plurality of stepped patterns corresponding to the plurality of phase delay regions, and a step size s1 of each of the stepped patterns satisfies expressions:

$(n1-n0)s1=m\lambda1$, and $(n3-n0'')s1=n\lambda3$, where n1 and n3 denote the refractive indices of an optical medium of the first phase compensator, respectively, with respect to the wavelengths $\lambda1$ and $\lambda3$, and n0 and n0'' denote the refractive indices of an air region of the phase compensator, respectively, with respect to the wavelengths $\lambda1$ and $\lambda3$.

The second phase compensator may comprise a plurality of stepped patterns corresponding to the plurality of phase delay regions, wherein a step size s1 of each of the stepped patterns satisfies expressions:

$(n1'-n0)s2=p\lambda1$, and $(n2'-n0')s2=q\lambda2$, where n1' and n2' denote the refractive indices of an optical medium of the second phase compensator, respectively, with respect to the wavelengths $\lambda1$ and $\lambda2$, and n0 and n0' denote the refractive indices of an air region of the second phase compensator, respectively, with respect to the wavelengths $\lambda1$ and $\lambda2$.

In the compatible optical pickup according to the present invention, the second optical disc is a DVD family optical disc, the third optical disc is a CD family optical disc, and the first optical disc has a higher recording density than the second optical disc. The first optical disc may have a smaller thickness of, for example, about 0.1 mm, than the second optical disc.

The objective lens may have a numerical aperture of 0.7 or greater to be suitable for the first optical disc. The objective lens may have a working distance of 0.7 mm or greater.

The compatible optical pickup according to the present invention may further comprise an aperture filter which alters an effective numerical aperture of the objective lens for at least one of the second and third light to be suitable for recording on and/or reproduction from at least one of the second and third optical discs. In this case, the aperture filter is integrally formed with at least one of the first and second phase compensators.

In the compatible optical disc according to the present invention, the first light is light of a blue-violet wavelength region, the second light is light of a red wavelength region, and the third light is light of an infrared wavelength region. The wavelength $\lambda1$ may be about 400–410 nm, the wavelength $\lambda2$ may be about 635 nm or about 650 nm, and the wavelength $\lambda3$ may be about 780 nm.

BRIEF DESCRIPTION OF THE DRAWINGS

The above object and advantages of the present invention will become more apparent by describing in detail embodiments thereof with reference to the attached drawings in which.

DESCRIPTION OF THE PREFERRED EMBODIMENTS

Figure 1:
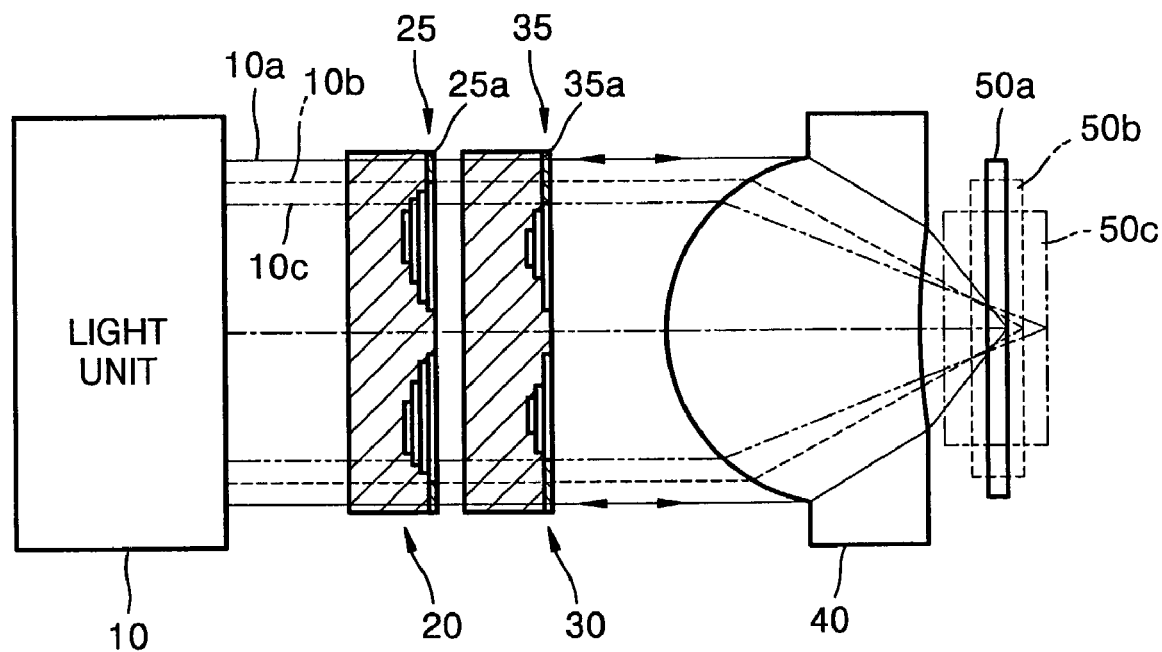
FIG. 1 shows a compatible optical pickup according to the present invention.

Reference will now be made in detail to the present embodiments of the present invention, examples of which are illustrated in the accompanying drawings, wherein like reference numerals refer to like elements throughout.

Referring to FIG. 1, a compatible optical pickup according to the present invention includes, a light unit 10 which emits first, second, and third lights 10a, 10b, and 10c of different wavelengths suitable for recording information on and/or reproducing information from the respective first, second, and third optical discs 50a, 50b,and 50c and detects an information signal and an error signal by receiving the light reflected from the respective first, second, and third optical discs 50a, 50b,and 50c, an objective lens 40 which focuses the first, second, and third lights 10a, 10b, and 10c incident from the light unit 10 to form a light spot on the respective first, second, and third optical discs 50a, 50b, and 50c, and first and second phase compensators 20 and 30 which are arranged at the entrance pupil of the objective lens 40 and induce a phase variation with respect to the respective second and third lights 10b and 10c.

The first optical disc 50a may have a smaller thickness than a DVD, for example, as an HD-DVD family optical disc (hereinafter, HD-DVD). Where the first optical disc 50a is a HD-DVD, the second optical disc 50b may be a DVD family optical disc (hereinafter, DVD), and the third optical disc 50c may be a CD family optical disc (hereinafter, CD).

Where the optical pickup according to the present invention is compatible to record and/or reproduce information to/from the CD, the DVD, and the HD-DVD, the first light 10a may be light of a blue-violet wavelength region ranging, for example, from about 400 nm to about 410 nm, the second light 10b may be light of a red wavelength region ranging, for example, from about 635 nm to about 650 nm, and the third light 10c may be light of an infrared wavelength range, for example, having a wavelength of about 780.

The objective lens 40 is designed to be suitable for recording and/or reproduction with respect to the high-density first optical disc 50a and has an NA of 0.7 or greater, and may have an NA of 0.85. In this case, to prevent the objective lens 40 from colliding with the second and third optical discs 50b and 50c, where the second or third optical disc is adopted, due to a greater thickness than the first optical disc 50a, the objective lens 40 may have a large working distance of, for example, 0.7 mm or greater.

Since the second and third optical discs 50b and 50c have different thicknesses from the first optical disc 50a, when the second light 10b is focused by the objective lens 40 to form a light spot on the second optical disc 50b, spherical aberration occurs due to the difference in thickness between the first and second optical discs 50a and 50b. Likewise, when the third light 10c is focused by the objective lens 40 to form a light spot on the third optical disc 50c, spherical aberration occurs due to the difference in thickness between the first and third optical discs 50a and 50c. Also, when the second and third lights 10b and 10c are focused by the objective lens 40, chromatic aberration occurs due to differences in wavelength from the first light 10a.

The first phase compensator 20 is for compensating for the spherical aberration and/or chromatic aberration occurring with respect to the second light 10b when recording and/or reproduction is performed on the second optical disc 50b. The second phase compensator 30 is for compensating for the spherical aberration and/or chromatic aberration occurring with respect to the third light 10c when recording and/or reproduction is performed on the third optical disc 50c.

To compensate for aberration occurring when recording and/or reproduction is performed on the second optical disc 50b, the first phase compensator 20 includes a plurality of phase delay regions to induce phase difference variations with respect to only the second light 10b. The plurality of phase delay regions may be designed such that a phase difference with respect to each of the first and third lights 10a and 10c after passing through one phase delay region and another adjacent phase delay region is about an integer multiple of the reflective wavelengths $\lambda 1$ and $\lambda 3$ of the first and third lights 10a and 10c, as expressed by expression (3) below.

In other words, denoting the amount the phase is delayed by one phase delay region of the first phase compensator 20 for the first and third lights 10a and 10c as a and a', respectively, and the amount the phase is delayed by another phase delay region of the first phase compensator 20 for the first and third lights 10a and 10c as b and b', respectively, the phase differences for the first and third lights 10a and 10c after passing through the adjacent phase delay regions satisfy expression (3) below:

$$\left. \begin{matrix} (a-b) = m\lambda 1 \\ (a'-b') = n\lambda 3 \end{matrix} \right\} \quad (3)$$

where m and n are values in a range including (j−0.07) and (j+0.07), where j is an integer. The coefficients m and n may be values in a range including (j−0.05) and (j+0.05), where j is an integer.

Here, the first phase compensator 20 induces a phase variation with respect to the second light 10b while just passing the first and third lights 10a and 10c without phase variations.

Likewise, to compensate for aberration occurring when recording and/or reproduction is performed on the third optical disc 50c, the second phase compensator 30 includes a plurality of phase delay regions to induce phase difference variations with respect to only the incident third light 10c. The plurality of phase delay regions may be designed such that a phase difference with respect to each of the first and second lights 10a and 10b after passing through one phase delay region and another adjacent phase delay region is about an integer multiple of the reflective wavelengths $\lambda 1$ and $\lambda 2$ of the first and second lights 10a and 10b. In other words, denoting the amount the phase is delayed by one phase delay region of the second phase compensator 30 for the first and second lights 10a and 10b as c and c', respectively, and the amount the phase is delayed by another phase delay region of the second phase compensator 30 for the first and second lights 10a and 10b as d and d', respectively, the phase differences for the first and second lights 10a and 10b after passing through the adjacent phase delay regions may satisfy expression (4) below:

$$\left.\begin{array}{l}(c-d)=p\lambda 1\\(c'-d')=q\lambda 2\end{array}\right\} \quad (4)$$

where p and q are values in a range including (j−0.07) and (j+0.07) where j is an integer, and may be in a range including (j−0.05) and (j+0.05) where j is an integer.

Here, the second phase compensator 30 induces a phase difference variation with respect to the third light 10b while just passing the first and second lights 10a and 10b without phase variations.

Figure 2:
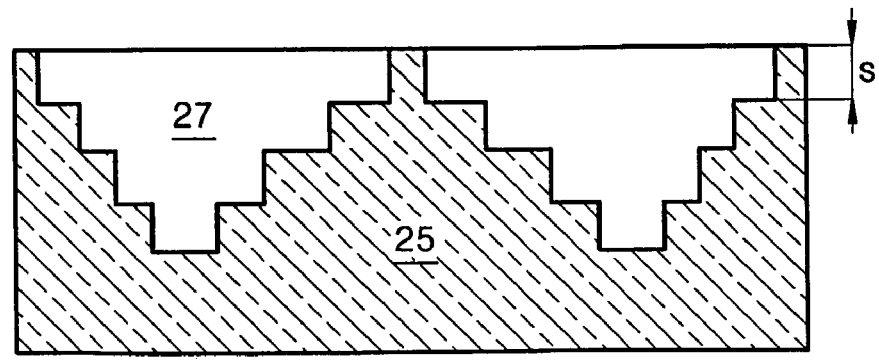
FIG. 2 shows an embodiment of first and second phase compensators used in the compatible optical pickup according to the present invention.

In an embodiment, each of the first and second phase compensators 20 and 30 may have stepped patterns in at least one surface of a plate type optical medium, which induce phase difference variations to compensate for aberration occurring when the second and third optical disc 50b and 50c are compatibly adopted, as shown in FIG. 2. In FIG. 2, reference numeral 25 denotes an optical medium region made of, for example, glass, used for the manufacture of the first and second phase compensators 20 and 30, and reference numeral 27 denotes an air region adjacent the stepped pattern. Also, s in FIG. 2 denotes a step size.

The step sizes in the stepped patterns for the first and second phase compensators 20 and 30 are determined to satisfy expressions (3) and (4) above, respectively. The step sizes s for each of the first and second phase compensators 20 and 30 are determined such that a phase difference of light that just transmits through the first and second phase compensators 20 and 30 is about an integer multiple of the respective wavelengths such that phase difference variations are induced with respect to only the wavelength of light corresponding to the loaded recording medium. Here, the steps of the stepped patterns correspond to the phase delay regions, respectively. A phase difference is about an integer multiple where the phase of the light is either not significantly altered (a case where the integer is zero) or where the phase of the light is altered by an amount corresponding to about one or more full wavelengths of the light (cases where the integer is 1, 2, 3, . . . etc.). Where the HD-DVD disc is loaded, the phase difference induced in light having the wavelength $\lambda 1$ in both of the first and second phase compensators corresponds to an integer multiple of $\lambda 1$. Where the DVD is loaded, the phase difference induced in light having the wavelength $\lambda 2$ by one of the first and second phase compensators corresponds to an integer multiple of $\lambda 2$ and the phase difference induced in light having the wavelength $\lambda 2$ by the other of the first and second phase compensators does not correspond to the integer multiple of $\lambda 2$. Where the CD is loaded, the phase difference induced in light having the wavelength $\lambda 3$ by the other of the first and second phase compensators corresponds to an integer multiple of $\lambda 3$ and the phase difference induced in light having the wavelength $\lambda 3$ by the one of the first and second phase compensators does not correspond to the integer multiple of $\lambda 3$.

A step size s1 in the stepped patterns for the first phase compensator 20 may satisfy expression (5) to comply with expression (3):

$$\left.\begin{array}{l}(n1-n0)s1=m\lambda 1\\(n3-n0'')s1=n\lambda 3\end{array}\right\} \quad (5)$$

where n1 and n3 denote the refractive indices of the optical medium region of the first phase compensator 20, respectively, with respect to the wavelengths $\lambda 1$ and $\lambda 3$ of the first and third lights 10a and 10c, and n0 and n0" denote the refractive indices of the air region, respectively, with respect to the wavelengths $\lambda 1$ and $\lambda 3$ of the first and third lights 10a and 10c.

A step size s2 in the stepped patterns for the second phase compensator 30 may satisfy expression (6) to comply with expression (4):

$$\left.\begin{array}{l}(n1'-n0)s2=p\lambda 1\\(n2'-n0')s2=q\lambda 2\end{array}\right\} \quad (6)$$

where n1' and n2' denote the refractive indices of the optical medium region of the second phase compensator 30, respectively, with respect to the wavelengths $\lambda 1$ and $\lambda 2$ of the first and second lights 10a and 10b, and n0 and n0' denote the refractive indices of the air region, respectively, with respect to the wavelengths $\lambda 1$ and $\lambda 2$ of the first and second lights 10a and 10b.

As shown in Table 1, where the first, second, and third optical discs 50a, 50b, and 50c are a HD-DVD, a DVD, and a CD, respectively, and the wavelengths $\lambda 1$, $\lambda 2$, and $\lambda 3$ of the first, second, and third lights 10a, 10b, and 10b for use in recording on and/or reproduction from the first, second, and third optical discs 50a, 50b, and 50c are 400 nm, 650 nm, 780 nm, respectively, glass BK7 has a refractive index of 1.530849 at 400 nm, 1.514520 at 650 nm, and 1.511183 at 780 nm.

TABLE 1

|  | HD-DVD | DVD | CD |
|---|---|---|---|
| Wavelength | 400 nm ($\lambda 1$) | 650 nm ($\lambda 2$) | 780 nm ($\lambda 3$) |
| Refractive Index of BK7 | 1.530849 | 1.514520 | 1.511183 |

Figure 3A:
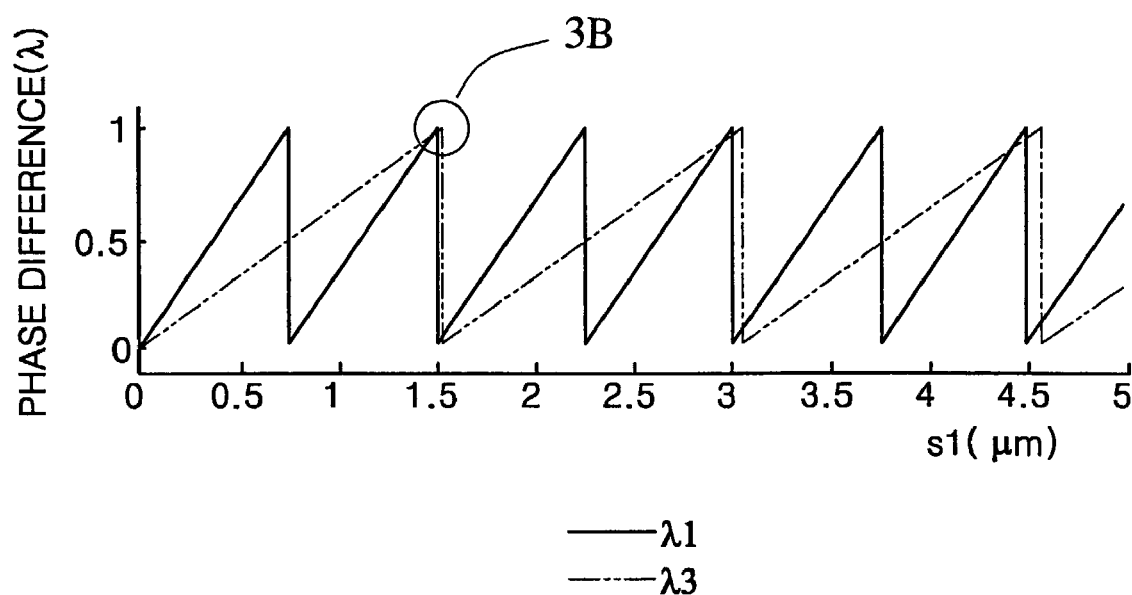
FIG. 3A is a graph of phase differences with respect to step size s1, which are induced with respect to a first light of a wavelength of $\lambda1$ for an HD-DVD and a third light of a wavelength $\lambda3$ for a CD by the first phase compensator of FIG. 1 where BK7 is used for an optical medium of the first phase compensator.

FIG. 3A is a graph of phase differences for the wavelength $\lambda 1$ of the first light 10a for an HD-DVD and the wavelength $\lambda 3$ of the third light 10c for a CD with respect to the step size s1 of the first phase compensator 20 where BK7 is used as the optical medium of the first phase compensator 20. The graph of FIG. 3A is obtainable with those types of the first, second, and third optical discs 50a, 50b, and 50c and those wavelengths of light listed in Table 1 above.

Figure 3B:
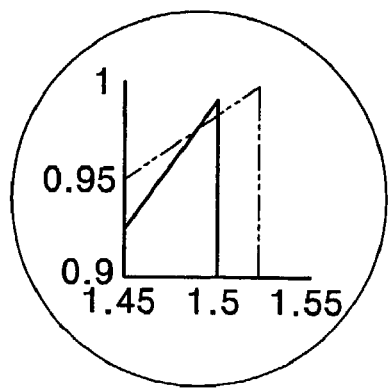
FIG. 3B is an enlarged view of a portion of FIG. 3A.

Referring to FIGS. 3A and 3B, where a stepped pattern is formed in an optical medium of BK7 with a step size s1 of 1.5 μm, a phase difference of 0.99 λ1, which approximates to an integer multiple of the wavelength λ1 occurs with respect to the wavelength λ1 of the first light 10a for the HD-DVD and a phase difference of 0.98 λ3, which approximates to an integer multiple of the wavelength λ3 occurs with respect to the wavelength λ3 of the third light 10c for the CD. A phase difference (not shown in FIGS. 3A and 3B) of 0.20 λ2 occurs with respect to the wavelength λ2 of the second light 10b for the DVD at the step size of 1.5 μm. Here, a step size of a stepped pattern formed in a phase compensator that has a phase difference equal to an integer multiple of a phase difference for a predetermined wavelength of light means that a phase difference variation is not induced by the pattern where the predetermined wavelength of light passes the phase compensator.

Therefore, the first phase compensator 20 satisfying expressions (3) and (5) above is obtainable by forming a stepped pattern having a step size s1 of 0.5 μm in an optical medium of BK7.

Analogous to the first phase compensator 20, the second phase compensator 30 which just passes the first and second lights 10a and 10b, respectively, and induces a phase difference variation with respect to only the third light 10c is obtainable by forming a stepped pattern in a predetermined optical medium to comply with expression (6) above, as described with reference to the first phase compensator 20. The second phase compensator 30 will be described in more detail below.

As described above, where a pattern having a step size s1 satisfying expression (5) above is formed in the first phase compensator 20, the first and third lights 10a and 10c are allowed to transmit through the first phase compensator 20 whereas a phase difference variation according to the pattern occurs with respect to the second light 10b passing the first phase compensator 10. Likewise, where a pattern having a step size s2 satisfying expression (6) above is formed in the second phase compensator 30, the first and second lights 10a and 10b are allowed to transmit through the second phase compensator 30 whereas a phase difference variation according to the pattern occurs with respect to the third light 10c passing the second phase compensator 20.

Therefore, an optical pickup according to the present invention comprising two types of phase compensators, i.e., the first and second phase compensators 20 and 30, which are constructed with a different step size in their pattern that is equal to an integer multiple of two wavelengths of light such that a phase difference variation is induced with respect to only one wavelength of light for a corresponding optical disc, are compatible for three optical discs having different thicknesses.

Referring to FIG. 1, the compatible optical pickup according to the present invention may further comprise a first aperture filter 25 for altering an effective NA of the objective lens for the second light 10b and a second aperture filter 35 for altering the effective NA of the objective lens 40 for the third light 10c.

The first and second aperture filters 25 and 35 may be wavelength selective coating members or holographic diffraction members capable of altering the effective NA of the objective lens 40 by transmitting light incident through their center portion and selectively hindering proceeding of light incident through their respective outer ring portions 25a and 35a depending on the wavelength of the incident light.

As shown in FIG. 1, the first and second aperture filters 25 and 35 may have a structure having the ring portions 25a and 35a, respectively, around an inner aperture. The first and second aperture filters 25 and 35 may be integrally formed with the first and second phase compensators 20 and 30, respectively.

The ring portion 25a of the first aperture filter 25 is designed to block proceeding of only the second light 10b and to transmit the remaining wavelengths of light, i.e., the first and third lights 10a and 10c. The ring portion 25a of the first aperture filter 25 may have an inner diameter that gives the objective lens 40 an effective NA appropriate for recording and/or reproduction with respect to the second optical disc 50b. For example, where the second optical disc 50b is a DVD, the inner diameter of the ring portion 25a of the first aperture filter 25 may be determined to give the objective lens 40 an effective NA of 0.6.

The ring portion 35a of the second aperture filter 35 is designed to block proceeding of only the third light 10c and to transmit the remaining wavelengths of light, i.e., the first and second lights 10a and 10b. The ring portion 35a of the second aperture filter 35 may have an inner diameter that gives the objective lens 40 an effective NA appropriate for recording and/or reproduction with respect to the third optical disc 50c. For example, where the third optical disc 50c is a CD, the inner diameter of the ring portion 35a of the second aperture filter 35 is determined to give the objective lens 40 an effective NA of 0.45.

Figure 4:
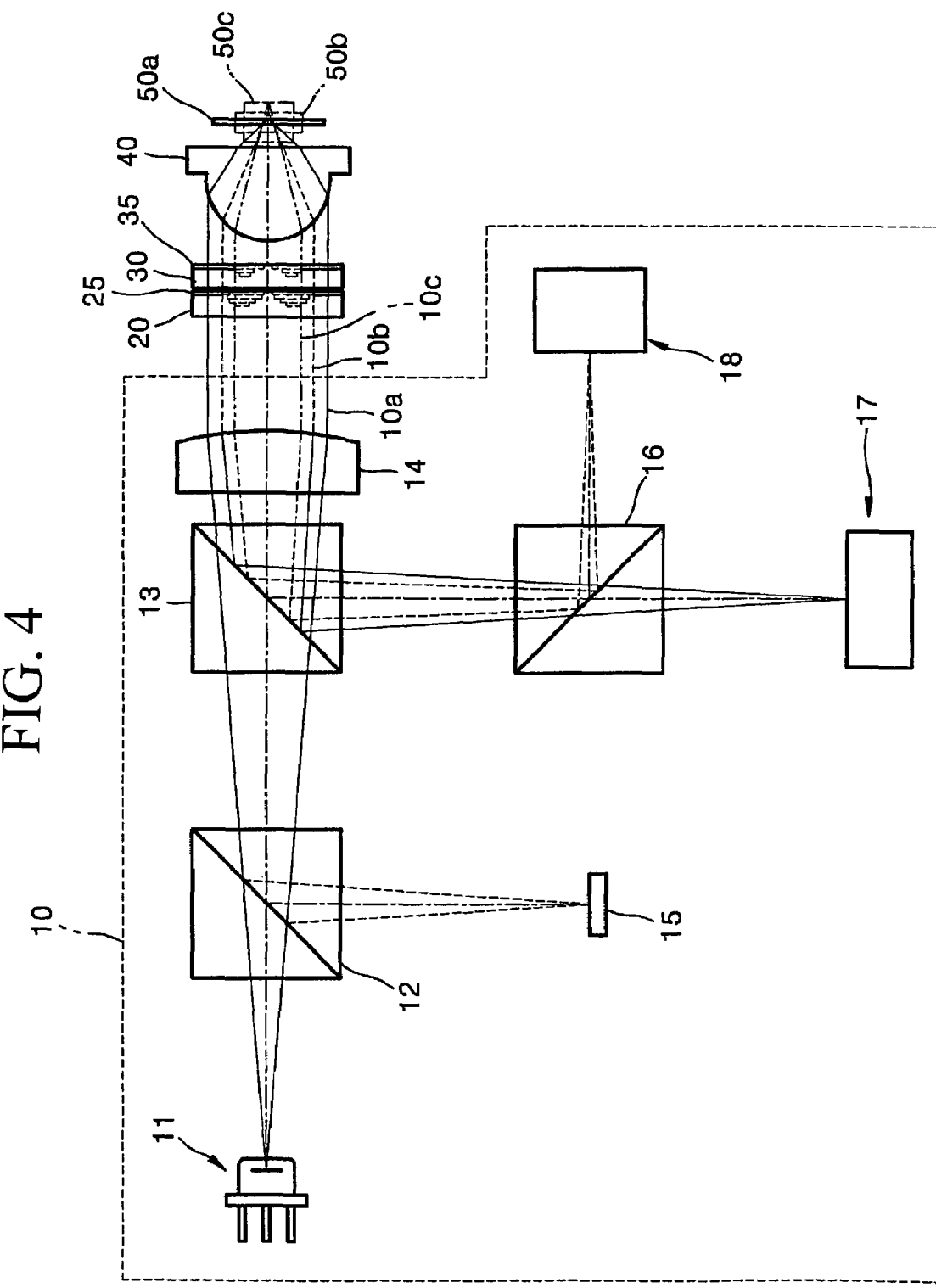
FIG. 4 shows the optical structure of a compatible optical pickup according to an embodiment of the present invention.

FIG. 4 shows the optical structure of a compatible optical pickup according to a preferred embodiment of the present invention. Referring to FIG. 4, the optical unit 10 includes a first light source 11 which emits the first light 10a of the wavelength λ1 suitable for recording and/or reproduction with respect to the first optical disc 50a, a first photodetector 15 which receives and detects the light reflected from the first optical disc 50a, a first light module 17 which emits the second light 10b of the wavelength λ2 suitable for recording and/or reproduction with respect to the second optical disc 50b, a second light module 18 which emits the third light 10c of the wavelength λ3 suitable for recording and/or reproduction with respect to the third optical disc 50c, and first, second, and third optical path changers 12, 16, and 13 which alter the travelling paths of the first, second, and third lights 10a, 10b, and 10c emitted from the first light source 11 and the first and second light modules 17 and 18, respectively.

Where the first optical disc 50a is an HD-DVD, a blue-violet semiconductor laser for emitting the first light 10a of, for example, a wavelength of 400 nm, may be used as the first light source 11.

The first light module 17 has a combination structure of a light source for emitting the second light 10b and a photodetector for receiving the second light 10b reflected from the second optical disc 50b. Likewise, the second light module 18 has a combination structure of a light source for emitting the third light 10c and a photodetector for receiving the third light 10c reflected from the third optical disc 50c. Where the second and third optical discs 50b and 50c are a DVD and a CD, respectively, a red semiconductor laser for emitting the second light 10b of, for example, a wavelength of 650 nm may be used as the light source of the first light module 17, and an infrared semiconductor laser for emitting the third light 10c of, for example, a wavelength of 780 nm may be used as the light source of the second light module 18.

The structures of the first and second light modules 17 and 18 are well known in the field, and thus detailed descriptions and illustrations thereof will be omitted here.

The light unit 10 may further comprise a collimating lens 14 on the optical path between the third optical path changer 13 and the objective lens 40, which condenses and approximately collimates the first, second, and third lights 10a, 10b, and 10c emitted, respectively, from the first light source 11 and the first and second light modules 17 and 18.

The structure of the light unit 10 shown in FIG. 4 is an example for explaining the compatible optical pickup according to the present invention. Accordingly, a variety of light units having different structures may be applied to the compatible optical pickup according to the present invention. In addition, although in the embodiment of FIG. 4 the first, second, and third optical path changers 12, 16, and 13 are illustrated as being constructed with a beam splitter, the present invention is not limited to this structure, and various changes may be made to the first, second, and third optical path changers 12, 16, and 13.

The compatible optical pickup according to the present invention operates as described below.

Referring again to FIGS. 1–4, when the first optical disc 50a is loaded, the first light 10a emitted from the light unit 10 proceeds towards the first and second phase compensators 20 and 30. The first light 10a sequentially transmits through the first phase compensator 20, the first aperture filter 25, the second phase compensator 30, and the second aperture filter 35 and is focused by the objective lens 40 to form a light spot on a recording surface of the first optical disc 50a. The first light 10 reflected from the first optical disc 50a returns to the light unit 10 via an opposite path to the path described above.

When the second optical disc 50b is loaded, the second light 10b emitted from the light unit 10 enters the first phase compensator 20, and a phase difference variation with respect to the second light 10b is induced therein to compensate for spherical aberration and/or chromatic aberration. Next, the second light 10b enters the first aperture filter 25. A portion of the second light 10b is blocked by the ring portion 25a of the first aperture filter 25, and only a portion of the second light 10b passing the inner aperture of the first aperture filter 25 surrounded by the ring portion 25a transmits through the first aperture filter 25. As a result, the beam size of the second light 10b is changed to give the objective lens 40 an effective NA of, for example, 0.6, suitable for recording and/or reproduction with respect to the second optical disc 50b. The second light 10b sequentially transmits through the second phase compensator 30 and the second aperture filter 35 and is focused by the objective lens 40 to form a light spot on a recording surface of the second optical disc 50b. The second light 10b reflected from the second optical disc 50b returns to the light unit 10 via an opposite path to the path described above.

When the third optical disc 50c is loaded, the third light 10c emitted from the light unit 10 transmits through the first phase compensator 20 and the first aperture filter 25 and enters the second phase compensator 30. A phase difference variation with respect to the third light 10c is induced therein to compensate for spherical aberration and/or chromatic aberration. Next, the third light 10c enters the second aperture filter 35. A portion of the third light 10c is blocked by the ring portion 35a of the second aperture filter 35, and only a portion of the third light 10c passing the inner aperture of the second aperture filter 35 surrounded by the ring portion 35a transmits through the second aperture filter 35. As a result, the beam size of the third light 10c is changed to give the objective lens 40 an effective NA of, for example, 0.45, suitable for recording and/or reproduction with respect to the third optical disc 50c. The third light 10c is focused by the objective lens 40 to form a light spot on a recording surface of the third optical disc 50c. The third light 10c reflected from the third optical disc 50c returns to the light unit 10 via an opposite path to the path described above.

Embodiments of the objective lens 40 and the first and second phase compensators 20 and 30 applicable to a compatible optical pickup according to the present invention will be described with reference to a case where the first, second, and third optical discs 50a, 50b, and 50c are a HD-DVD, a DVD, and a CD, respectively, and the first, second, and third lights 10a, 10b, and 10c have a wavelength λ1 of 400 nm, a wavelength of λ2 of 650 nm, and a wavelength of λ2 of 780 nm, respectively.

Design data for an embodiment of the objective lens 40 applicable to the compatible optical pickup according to the present invention is listed in Table 2. Here, the objective lens 40 according to the present invention is designed by using BaCD5_HOYA (having a refractive index of about 1.606048 at 400 nm) as an optical medium to have an entrance pupil diameter of about 3.886 mm, a focal length of about 2.286 mm, and an NA of 0.85 at 400 nm with respect to a HD-DVD, i.e., the first optical disc 10a, having a thickness of 0.1 mm. Also, the first optical disc 50a is assumed to have a refractive index of about 1.623343 at a wavelength of 400 nm. For reference, the refractive index of an optical disc means an effective refractive index of the medium ranging from a light incident surface to a recording surface through which light proceeds.

TABLE 2

| Surface | Curvature Radius (mm) | Thickness/Interval (mm) | Material (Glass) |
|---|---|---|---|
| Object Surface | Infinity | Infinity | |
| S1 | Infinity | 0.000000 | |
| S2 | 1.482974 | 1.963318 | BaCD5_HOYA |
| | K: −0.830113 | | |
| | A: 0.121087E−01 | B: 0.141346E−02 | C: 0.257098E−03 |
| | D: 0.249301E−04 | E: 0.102134E−04 | F: 0.312166E−05 |
| S3 | −10.53984 | 1.082337 | |
| | K: 9.901398 | | |
| | A: 0.267356E−01 | B: −0.403555E−02 | C: 0.220095E−03 |
| | D: 0.933479E−05 | | |
| S4 | Infinity | 0.100000 | 'CG' |
| S5 | Infinity | 0.000000 | |
| Image Surface | Infinity | 0.000000 | |

Figure 5A:
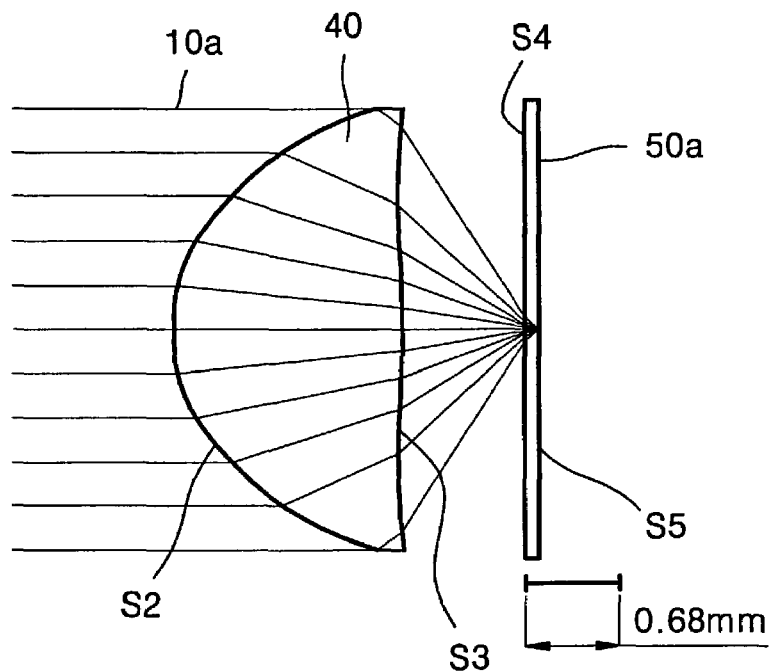
FIGS. 5A, 5B, and 5C show the optical paths of the first, second, and third lights of FIG. 1 where focused on an HD-DVD, DVD, and CD, respectively, by an objective lens manufactured with the design data of Table 2.

In Table 2, 'CG' means the medium of the first optical disc 50a, K is a conic coefficient of the first and second aspheric surfaces S2 and S3, and A, B, C, D, E, and F are aspheric coefficients. Those aspheric surfaces S1 through S5 of Table 1 are illustrated in FIG. 5A for reference.

The equation of an aspheric surface, for example, the first and second aspheric surfaces S2 and S3, is expressed by expression (7) below:

$$z = \frac{ch^2}{1 + \sqrt{1 - (1+K)c^2h^2}} + Ah^4 + Bh^6 + Ch^8 + Dh^{10} \qquad (7)$$
$$Eh^{12} + Fh^{14} + Gh^{16} + Hh^{18} + Jh^{20}$$

where z is a depth from the vertex of the aspheric surface, h is a height of the optical axis, c is a curvature radius, and A through H and J are aspheric coefficients.

Figure 5B:
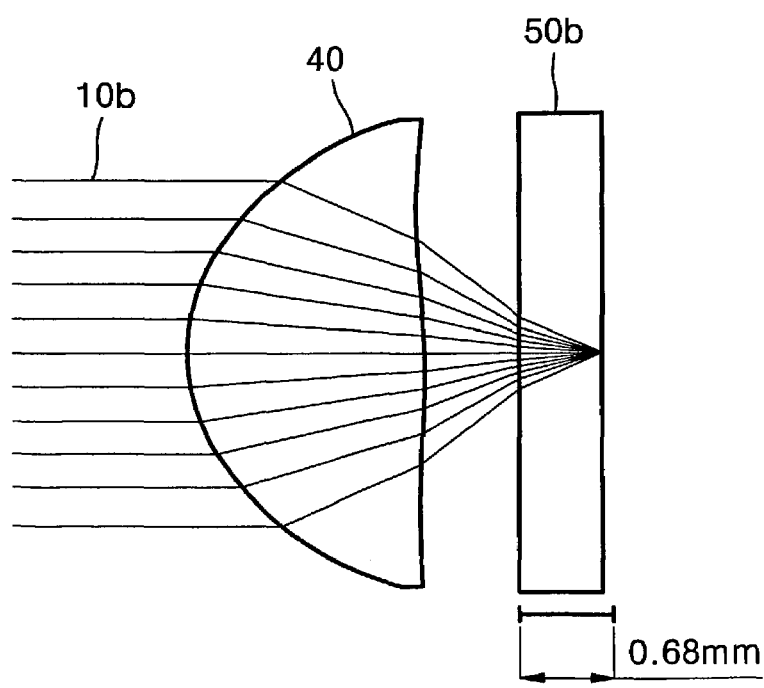
Figure 5C:
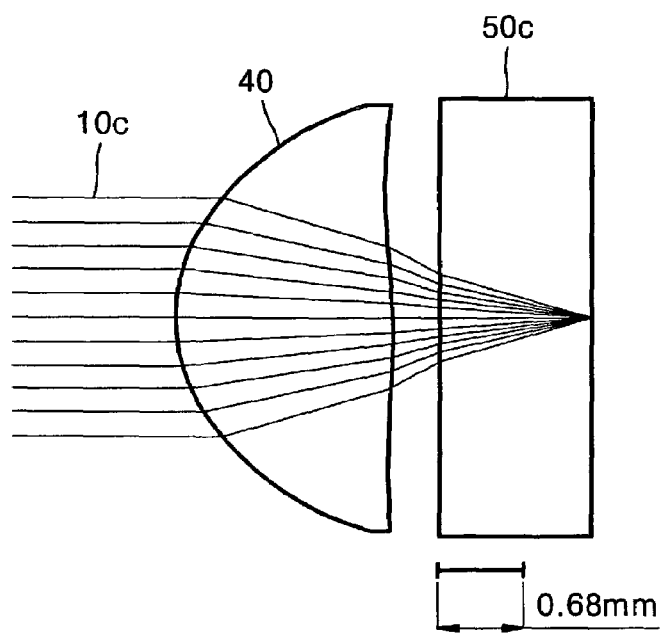

The objective lens 40 formed with the design data described above has a great working distance of 1.082337 mm, which is large enough to protect the objective lens 40 from colliding with any optical disc, including an HD-DVD, a DVD, and a CD shown in FIGS. 5A, 5B, and 5C, respectively, during recording and/or reproduction.

FIGS. 5A, 5B, and 5C show the optical paths of the first, second, and third lights 10a, 10b, and 10c where focused on an HD-DVD, DVD, and CD, respectively, by the objective lens 40 designed with the data of Table 2. Where the HD-DVD, DVD, and CD are loaded as shown in FIGS. 5A, 5B, and 5C, respectively, a focal length of the objective lens 40 is about 2.286 mm for the first light 10a, about 2.359 mm for the second light 10b, and about 2.375 mm for the third light 10c, as shown in Table 3. In addition, an effective diameter (NA) of the objective lens 40 is about 3.9 mm (NA=0.85) for the first light 10a, about 2.8 mm (NA=0.60) for the second light 10b, and about 2.1 mm (NA=0.45) for the third light 10c.

TABLE 3

|  | HD-DVD | DVD | CD |
| --- | --- | --- | --- |
| Wavelength | 400 nm (λ1) | 650 nm (λ2) | 780 nm (λ3) |
| Thickness of Optical Disc | 0.1 mm | 0.6 mm | 1.2 mm |
| Focal Length of Objective lens | 2.286 | 2.359 | 2.375 |
| Effective Diameter (NA) of Objective Lens | 3.9 mm (0.85) | 2.8 mm (0.60) | 2.1 mm (0.45) |
| OPDrms | 0.00 λ1 | 0.64 λ2 | 0.28 λ3 |

With regard to the amounts of aberration (OPDrms) occurring where the objective lens 40 manufactured with the design data of Table 2 is applied to a DVD and a CD, where the first light 10a of a wavelength of 400 nm is focused by the objective lens 40 to form a light spot on the HD-DVD 50a of a thickness of 0.1 mm, aberration almost does not occur, as shown in Table 3 and FIG. 5A. However, where the second light 10b of a wavelength of 650 nm is focused by the objective lens 40 to form a light spot on the DVD 50b of a thickness of 0.6 mm, aberration of about 0.64 λ2 occurs, as shown in Table 3 and FIG. 5B. Where the third light 10c of a wavelength of 780 nm is focused by the objective lens 40 to form a light spot on the CD 50c of a thickness of 1.2 mm, aberration of about 0.28 λ3 occurs, as shown in Table 3 and FIG. 5C. In other words, where the objective lens 40 is applied to a DVD and a CD, aberration occurs greatly beyond a general aberration tolerance of 0.035 λ.

However, by arranging the first and second phase compensators 20 and 30 at the entrance pupil of the objective lens 20, aberration occurring where a DVD and a CD are loaded is greatly reduced, as described below.

Embodiments of the first and second phase compensators 20 and 30 according to the present invention and an effect of reducing aberration occurring where a DVD or a CD is loaded will be described.

Figure 6:
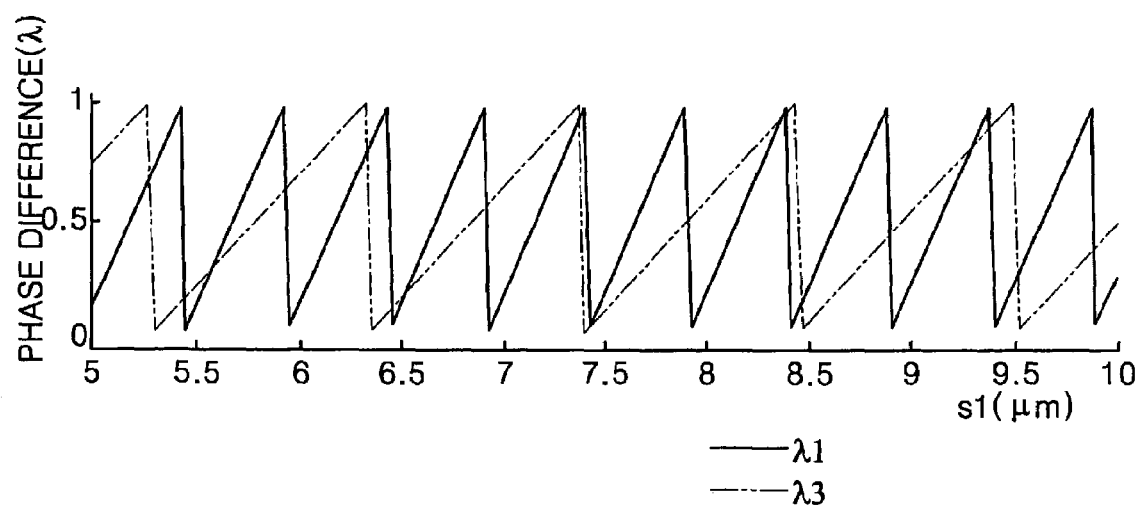
FIG. 6 is a graph of phase differences with respect to step size s1, which are induced with respect to the first light of a wavelength $\lambda1$ for a HD-DVD and the third light of a wavelength $\lambda3$ for a CD by the first phase compensator of FIG. 1 where EFD4_HOYA is used for the optical medium of the first phase compensator.
Figure 7:
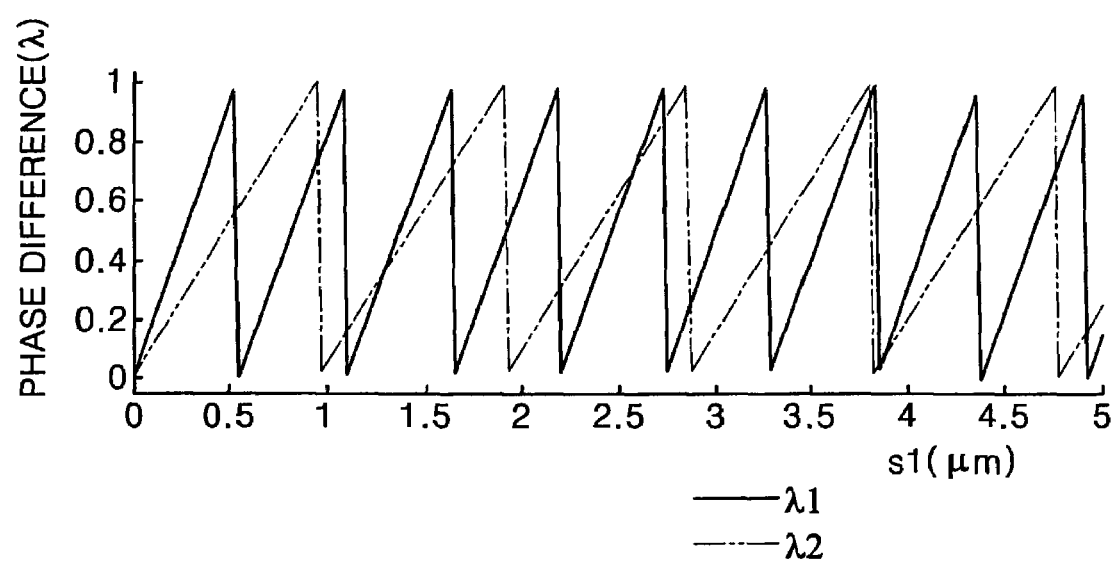
FIG. 7 is a graph of phase differences with respect to step size s2, which are induced with respect to the first light of a wavelength $\lambda1$ for a HD-DVD and the second light of a wavelength $\lambda2$ for a DVD by the second phase compensator of FIG. 1 where EFD8_HOYA is used for an optical medium of the second phase compensator.

The features of the first and second phase compensators 20 and 30 according to the embodiments of the present invention and the amounts of the remaining aberration after the first and second phase compensators 20 and 30 are used are shown in Table 4. FIG. 6 is a graph of phase differences with respect to step size s1, which are induced with respect to the first light 10a of a wavelength λ1 for a HD-DVD and the third light 10c of a wavelength λ3 for a CD by the first phase compensator 20 whose optical medium is formed of EFD4_HOYA. FIG. 7 is a graph of phase differences with respect to step size s2, which are induced with respect to the first light 10a of a wavelength λ1 for a HD-DVD and the second light 10b of a wavelength λ2 for a DVD by the second phase compensator 30 whose optical medium is formed of EFD8_HOYA. To obtain the data in Table 4 and FIGS. 6 and 7, the wavelength λ1 of the first light 10a for the HD-DVD is set to 400 nm, the wavelength λ3 of the third light 10c for the CD is set to 780 nm, and the wavelength λ2 of the second light 10a for the DVD is set to 650 nm.

TABLE 4

|  |  | HD-DVD | DVD | CD |
| --- | --- | --- | --- | --- |
| First Phase Compensator for DVD | Material of Glass | EFD4_HOYA | | |
|  | Step Size | 7.41 µm | | |
|  | The number of Steps | 4 steps | | |
|  | Phase Difference for Each Step | 0.99 λ1 | 0.53 λ2 | 0.01 λ3 |
|  | Refractive Index | 1.809201 | 1.747905 | 1.738138 |
|  | Aberration remaining after Compensation (OPDrms) | 0.012 λ1 | 0.026 λ2 | 0.016 λ3 |
| Second Phase Compensator for CD | Material of Glass | EFD8_HOYA | | |
|  | Step Size | 3.83 µm | | |
|  | The number of Steps | 3 steps | | |
|  | Phase Difference for Each Step | 0.01 λ1 | 0.02 λ2 | 0.31 λ3 |
|  | Refractive Index | 1.731744 | 1.683005 | 1.674996 |
|  | Aberration remaining after Compensation (OPDrms) | 0.00 λ1 | 0.024 λ2 | 0.029 λ3 |

Referring to Table 4 and FIG. 6, where EFD4_HOYA is used as the optical medium of the first phase compensator 20, and a step size s1 is 7.41 µm, a phase difference of about 0.99 λ1, which approximates to an integer multiple (integer 1) of the wavelength λ1, occurs with respect to the first light 10 for the HD-DVD, a phase difference of about 0.01 λ3, which approximates to an integer multiple (integer 0) of the wavelength λ3, occurs with respect to the third light 10c for the CD, and a phase difference of about 0.53 λ2 occurs with respect to the second light 10b for the DVD. The phase difference with respect to λ2, is not an approximate integer multiple.

As described above, where the first phase compensator 20 is formed by using EFD4_HOYA as its optical medium with a 4-step pattern of a step size s1 of 7.41 µm, phase difference variations almost do not occur while the first light 10a for a HD-DVD and the third light 10c for a CD pass the first phase compensator 20, but phase difference variations occur while the second light 10b for a DVD passes the first phase compensator 20. Therefore, by forming a pattern in the first phase compensator 20 to induce a phase difference variation that offsets aberration with respect to the second light 10b for a DVD, the aberration with respect to the second light 10b for the DVD is compensated.

Referring to Table 4 and FIG. 7, where EFD8_HOYA is used as the optical medium of the second phase compensator 30, and a step size s2 is 3.83 µm, a phase difference of about 0.01 λ1, which approximates to an integer multiple (integer 0) of the wavelength λ1, occurs with respect to the first light 10 for the HD-DVD, a phase difference of about 0.02 λ2 which approximates to an integer multiple (integer 0) of the wavelength λ2, occurs with respect to the second light 10b for the DVD, and a phase difference of about 0.31 λ3 occurs with respect to the third light 10c for the CD. The phase difference with respect to λ3, is not an approximate integer multiple.

As described above, where the second phase compensator 30 is formed by using EFD8_HOYA as its optical medium with a 3-step pattern of a step size s2 of 3.83 μm, phase difference variations almost do not occur while the first light 10a for a HD-DVD and the second light 10b for a DVD pass the second phase compensator 20, but phase difference variations occur while the third light 10c for a CD passes the second phase compensator 30. Therefore, by forming a pattern in the second phase compensator 30 to induce a phase difference variation that offsets aberration with respect to the third light 10c for a CD, the aberration with respect to the third light 10c for the CD is compensated.

Figure 8:
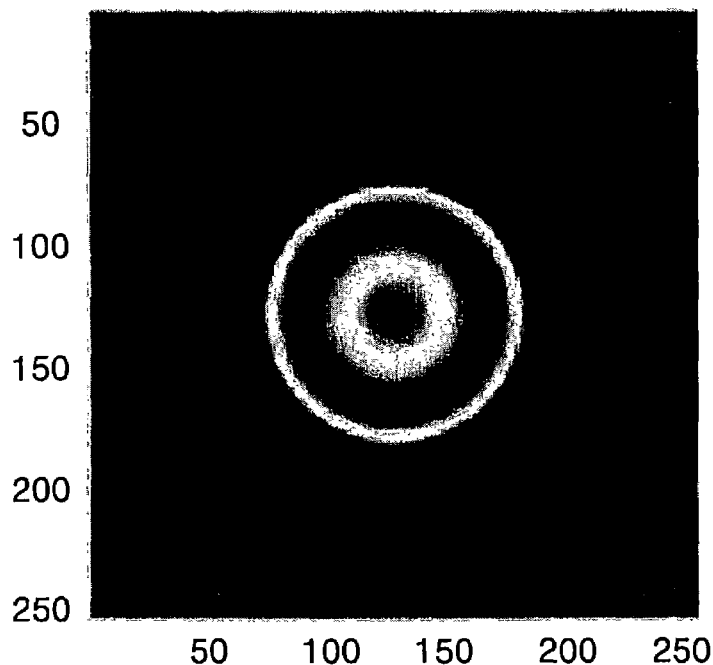
FIG. 8 shows a 2-dimensional distribution of a phase difference corresponding to spherical aberration occurring where a DVD is loaded.
Figure 9:
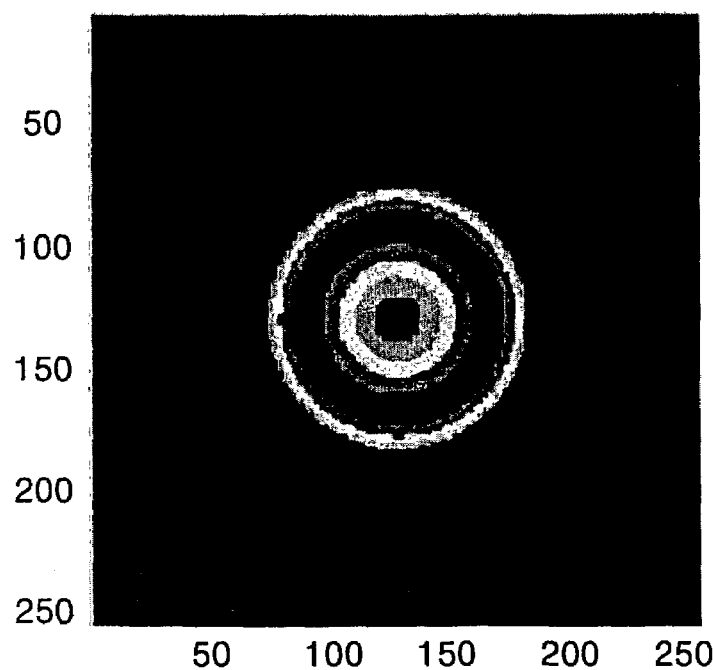
FIG. 9 shows a 2-dimensional distribution of a phase difference variation induced by the first phase compensator with a 4-step pattern to compensate for the phase difference (aberration) of FIG. 8.
Figure 10:
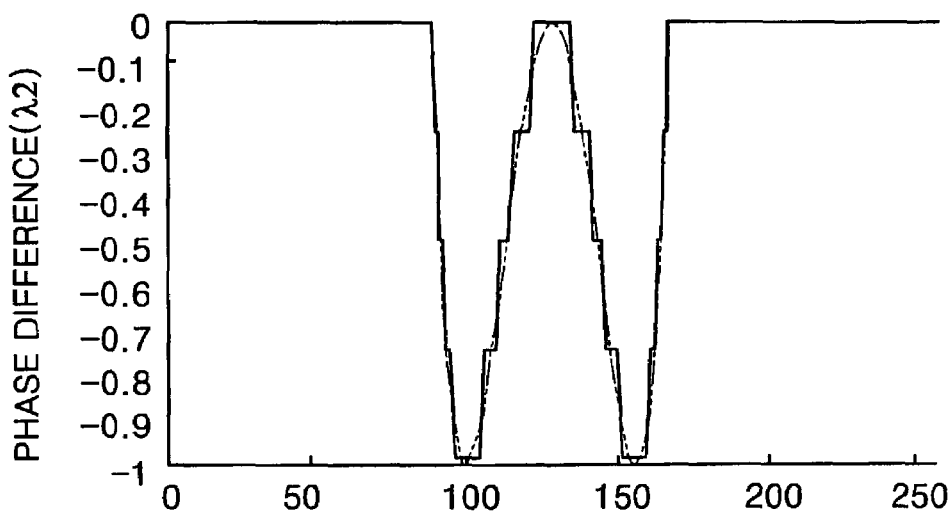
FIG. 10 shows a 1-dimensional phase distribution obtained by superimposing FIGS. 8 and 9.

FIG. 8 shows a 2-dimensional distribution of a phase difference corresponding to spherical aberration occurring when a DVD is loaded. FIG. 9 shows a 2-dimensional distribution of a phase difference variation induced by the first phase compensator 20 with a 4-step pattern to compensate for the phase difference (aberration) of FIG. 8. FIG. 10 shows a 1-dimensional distribution obtained by superimposing FIGS. 8 and 9. The phase difference of FIGS. 8 and 10 to be compensated for is an inversion of the phase difference with respect to aberration occurring when a DVD is loaded. In FIG. 10, the horizontal axis is on the same scale as that of FIGS. 8 and 9, and the vertical axis denotes the phase difference with respect to the second light 10b having the wavelength λ2 for the DVD.

As is apparent from FIG. 10, by using the first phase compensator 20 according to the present invention as described above, aberration occurring when a DVD is loaded is sufficiently compensated.

Figure 11A:
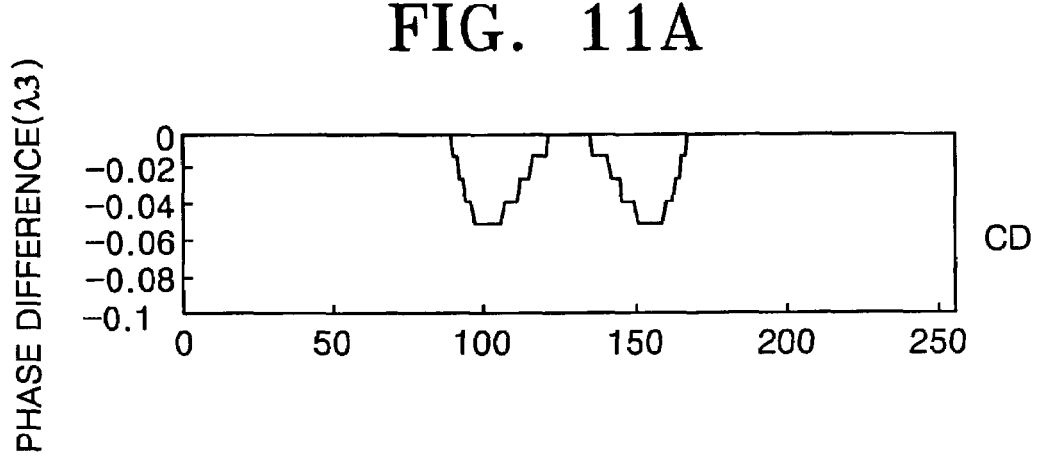
FIG. 11A shows phase differences remaining after passing through the first phase compensator where information is recorded on and/or reproduced from a CD.
Figure 11B:
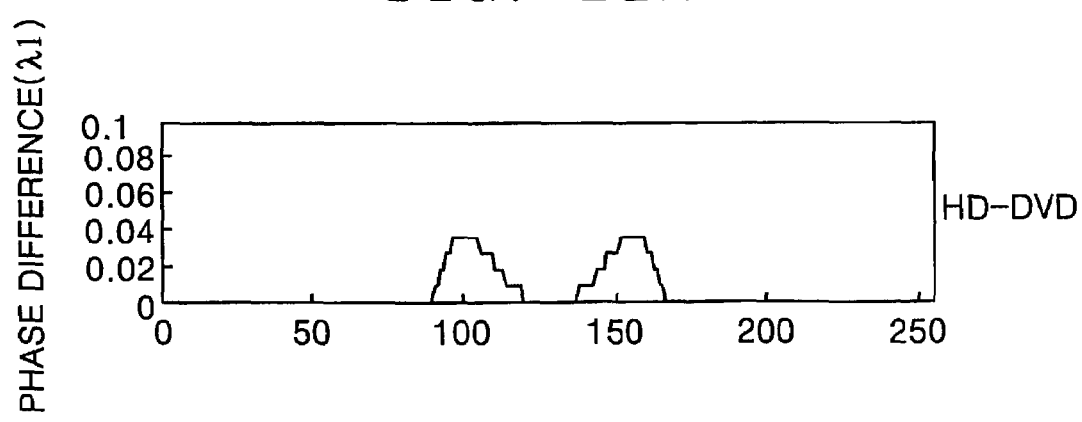
FIG. 11B shows phase differences remaining after passing through the first phase compensator where information is recorded on and/or reproduced from a HD-DVD.

Here, the step size s1 of the pattern formed in the first phase compensator 20 slightly deviates within the above-described error range of an integer multiple of the wavelength λ1 of the first light 10a for a HD-DVD and the wavelength λ3 of the third light 10c for a CD. Accordingly, where information is recorded on and/or reproduced from a CD and a HD-DVD, a phase difference may remain after passing through the first phase compensator 20, as shown in FIGS. 11A and 11B, respectively. Although the first phase compensator 20 maintains phase differences with respect to the first and third lights 10a and 10c as shown in FIGS. 11A and 11B, the amounts of the aberrations corresponding to the remaining phase differences are quite tolerable because they are greatly smaller than 0.035 λ, as shown in Table 4. In FIGS. 11A and 11B, the horizontal axes are on the same scale as in FIG. 10, and the vertical axes denote the phase difference in the wavelength λ3 for the CD and the wavelength λ1 for the HD-DVD, respectively.

Figure 12:
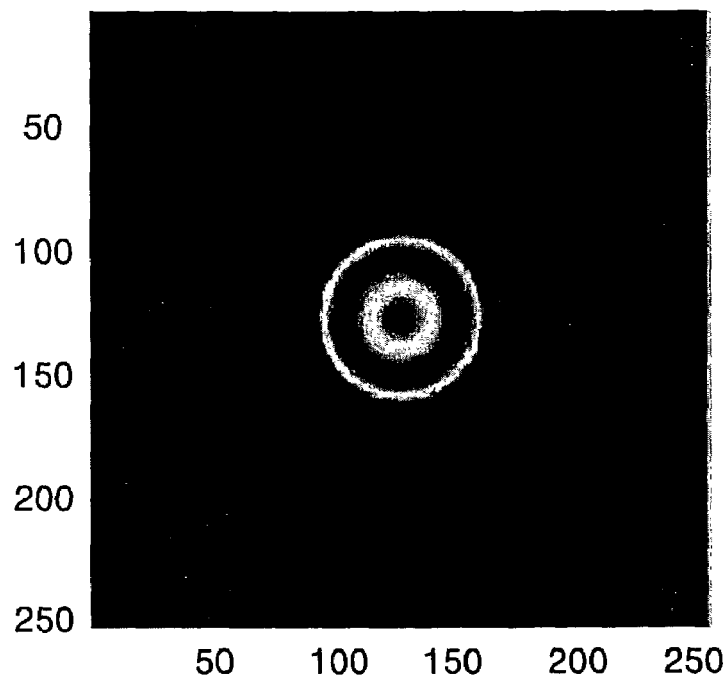
FIG. 12 shows a 2-dimensional distribution of a phase difference corresponding to spherical aberration occurring where a CD is loaded.
Figure 13:
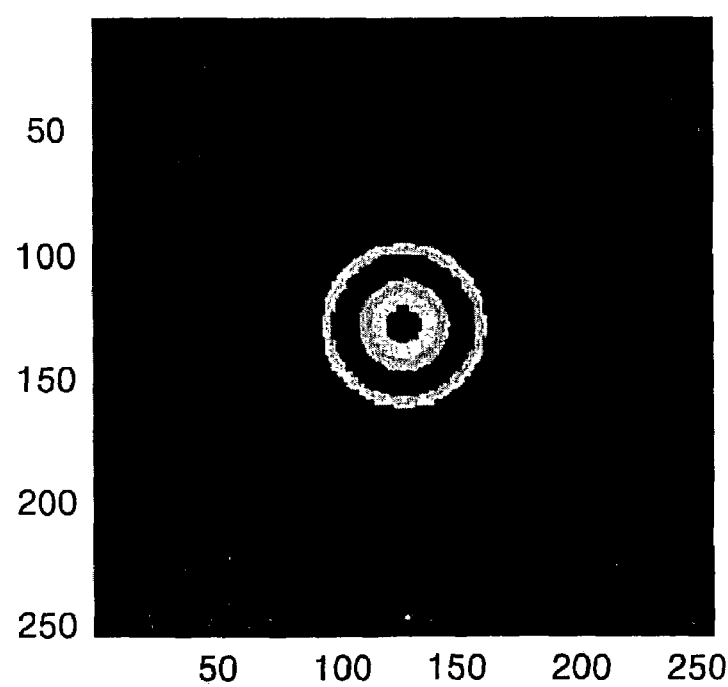
FIG. 13 shows a 2-dimensional distribution of a phase difference variation induced by the second phase compensator with a 3-step pattern to compensate for the phase difference (aberration) of FIG. 12.
Figure 14:
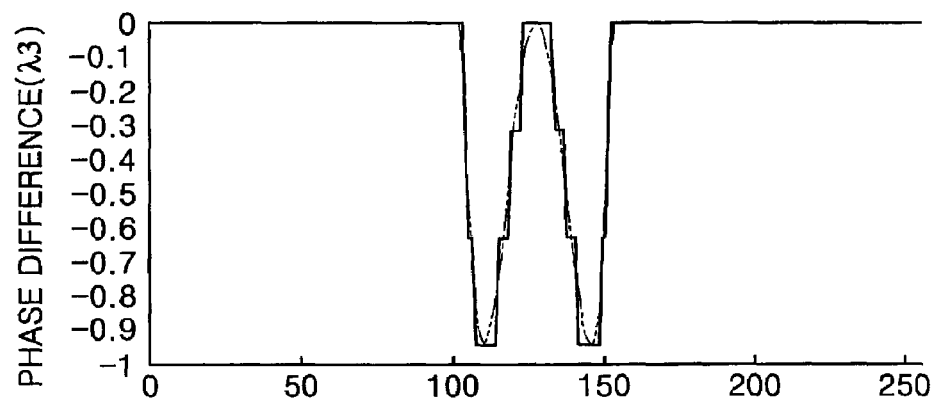
FIG. 14 shows a 1dimensional phase distribution obtained by superimposing FIGS. 12 and 13.

FIG. 12 shows a 2-dimensional distribution of a phase difference corresponding to spherical aberration occurring when a CD is loaded. FIG. 13 shows a 2-dimensional distribution of a phase difference variation induced by the second phase compensator 30 with a 3-step pattern to compensate for the phase difference (aberration) of FIG. 12. FIG. 14 shows a 1-dimensional distribution obtained by superimposing FIGS. 12 and 13. In FIG. 14, the horizontal axis is on the same scale as that of FIGS. 12 and 13, and the vertical axis denotes the phase difference in the wavelength λ3 for the CD.

As is apparent from FIG. 14, by using the second phase compensator 30 according to the present invention as described above, aberration occurring when a CD is loaded is sufficiently compensated.

Figure 15A:
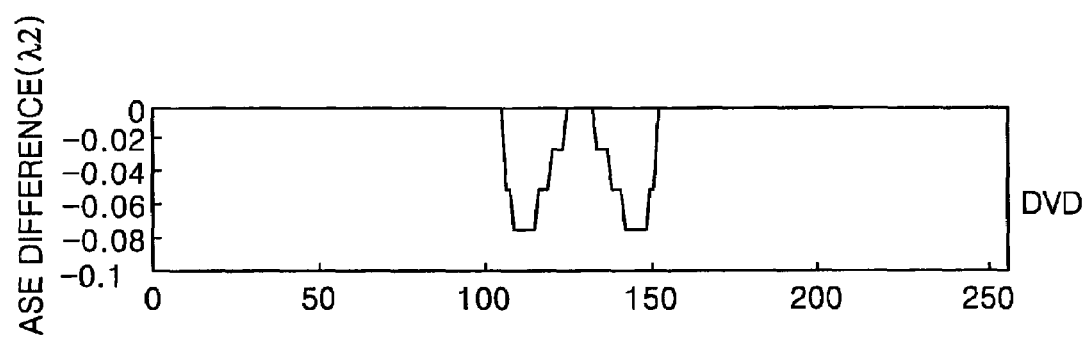
FIG. 15A shows phase differences remaining after passing through the second phase compensator where information is recorded on and/or reproduced from a DVD.
Figure 15B:
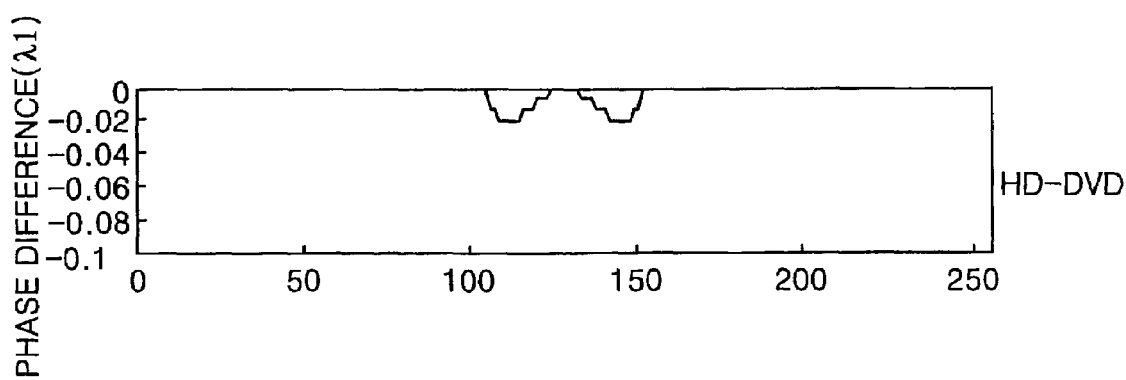
FIG. 15B shows phase differences remaining after passing through the second phase compensator where information is recorded on and/or reproduced from a HD-DVD.

Here, analogous to the first phase compensator 20, the step size s2 of the pattern formed in the second phase compensator 30 slightly deviates within the above-described error range of an integer multiple of the wavelength λ1 of the first light 10a for a HD-DVD and the wavelength λ2 of the second light 10b for a CD. Accordingly, where information is recorded on and/or reproduced from a DVD and a HD-DVD, a phase difference may remain after passing through the second phase compensator 30, as shown in FIGS. 15A and 15B, respectively. Although the second phase compensator 30 maintains phase differences with respect to the first and second lights 10a and 10b as shown in FIGS. 15A and 15B, the amounts of aberrations corresponding to the remaining phase differences are quite tolerable, as shown in Table 4. In FIGS. 15A and 15B, the horizontal axes are on the same scale as in FIG. 14, and the vertical axes denote the phase difference in the wavelength λ2 for the DVD and the wavelength λ1 for the HD-DVD, respectively. In FIGS. 8 through 15B, the numbers 50, 100, 150, 200 and 250 are arbitrary numbers to express a same scale.

Although a phase compensator according to the present invention has been described and illustrated in the above as being formed with a stepped pattern in an optical medium, various changes may be made to the phase compensator as long as it satisfies the requirements of expressions (3) and (4) above. For example, a phase compensator according to the present invention may be implemented with a liquid panel which is manufactured to comply with the requirements of expressions (3) and (4) above and operates to compensate for a phase difference with respect to a particular wavelength of light and to just transmit most of the other two wavelengths of light.

In addition, although a phase compensator according to the present invention has been described and illustrated in the above as being applicable to an optical pickup using three wavelengths of light to be compatible for first, second, and third optical discs having different thicknesses, the phase compensator according to the present invention is not limited to the compatible optical pickup and is applicable to a variety of optical systems that use three wavelengths of light and thus require selective aberration compensation depending on the wavelengths.

As described above, according to the present invention, the phase compensator compensates for a phase of a particular wavelength of incident light among three wavelengths of light and just transmits most of the other two wavelengths of light.

A compatible optical pickup according to the present invention includes a pair of phase compensators each of which compensates for a phase of a different wavelength of light to correct for spherical aberration due to a thickness difference between optical discs and/or chromatic aberration due to a wavelength difference between source lights. Therefore, the compatible optical pickup according to the present invention can record information on and/or reproduce information from three kinds of optical discs having different thicknesses by using one objective lens.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A phase compensator comprising:
   an optical medium having a plurality of phase delay regions which satisfy expressions:

$(a-b) = m\lambda_A$, and $$(a'-b')=n\lambda_B,$$

where $\lambda_A$ and $\lambda_B$ denote different wavelengths of incident light, a and a' denote an amount a phase is delayed by one phase delay region for the wavelengths $\lambda_A$ and $\lambda_B$, respectively, b and b' denote an amount the phase is delayed by an adjacent phase delay region for the wavelengths $\lambda_A$ and $\lambda_B$, respectively, and m and n are values in a range including (j−0.07) and (j+0.07), where j is an integer.

2. The phase compensator of claim 1, wherein the optical medium further comprises:
  a plurality of stepped patterns corresponding to the plurality of phase delay regions, wherein a step size s of each of the stepped patterns satisfies the expressions:

$$(n1-n0)s=m\lambda_A, \text{ and}$$

$$(n3-n0'')s=n\lambda_B,$$

where n1 and n3 denote refractive indices of the optical medium with respect to the wavelengths $\lambda_A$ and $\lambda_B$, respectively, and n0 and n0'' denote refractive indices of an air region of the phase compensator, respectively, with respect to the wavelengths $\lambda_A$ and $\lambda_B$.

3. The phase compensator of claim 1, wherein the wavelength $\lambda_A$ is a wavelength of a blue-violet light and the wavelength of $\lambda_B$ is one of a wavelength of a red light region and a wavelength of an infrared light.

4. The phase compensator of claim 2, wherein the wavelength $\lambda_A$ is a wavelength of a blue-violet light region and the wavelength of $\lambda_B$ is one of a wavelength of a red light region and a wavelength of an infrared light region.

5. The phase compensator of claim 3, wherein the wavelength $\lambda_A$ is about 400–410 nm and the wavelength $\lambda_B$ is one of about 635 nm, about 650 nm, and about 780 nm.

6. The phase compensator of claim 4, wherein the wavelength $\lambda_A$ is about 400–410 nm and the wavelength $\lambda_B$ is one of about 635 nm, about 650 nm, and about 780 nm.

7. A compatible optical pickup comprising:
  a light unit which emits first, second, and third lights having wavelengths $\lambda 1$, $\lambda 2$, and $\lambda 3$, respectively, suitable for recording information on and/or reproducing information from first, second, and third optical discs having different formats, respectively, and receives and detects light reflected from the respective first, second, and third optical discs;
  an objective lens which focuses the first, second, and third lights incident from the light unit to form a light spot on the respective first, second, and third optical discs;
  first and second phase compensators which are arranged between the light unit and an entrance pupil of the objective lens and induce a phase difference variation with respect to the respective second and third lights, and each of which phase compensators comprises a plurality of phase delay regions, and the first phase compensator satisfies expressions:

$$(a-b)=m\lambda 1, \text{ and}$$

$$(a'-b')=n\lambda 3,$$

where a and a' denote the amount the phase is delayed by one phase delay region of the first phase compensator for the first light of the wavelength $\lambda 1$ and the third light of the wavelength $\lambda 3$, respectively, b and b' denote the amount the phase is delayed by another adjacent phase delay region of the first phase compensator for the first light of the wavelength $\lambda 1$ and the third light of the wavelength $\lambda 3$, respectively, and m and n are values in a range including (j−0.07) and (j+0.07), where j is an integer, and the second phase compensator satisfies expressions:

$$(c-d)=p\lambda 1, \text{ and}$$

$$(c'-d')=q\lambda 2,$$

where c and c' denote an amount the phase is delayed by one phase delay region of the second phase compensator for the first light of the wavelength $\lambda 1$ and the second light of the wavelength $\lambda 2$, respectively, d and d' denote the amount the phase is delayed by another adjacent phase delay region of the second phase compensator for the first light of the wavelength $\lambda 1$ and the second light of the wavelength $\lambda 2$, respectively, and where p and q are values in a range including (j−0.07) and (j+0.07), where j is an integer.

8. The compatible optical pickup of claim 7, wherein the first phase compensator comprises a plurality of stepped patterns corresponding to the plurality of phase delay regions, and a step size s1 of each of the stepped patterns satisfies the expressions:

$$(n1-n0)s1=m\lambda 1, \text{ and}$$

$$(n3-n0'')s1=n\lambda 3,$$

where n1 and n3 denote refractive indices of an optical medium of the first phase compensator, respectively, with respect to the wavelengths $\lambda 1$ and $\lambda 3$, and n0 and n0'' denote the refractive indices of an air region of the phase compensator, respectively, with respect to the wavelengths $\lambda 1$ and $\lambda 3$.

9. The compatible optical pickup of claim 7, wherein the second phase compensator comprises a plurality of stepped patterns corresponding to the plurality of phase delay regions, wherein a step size s1 of each of the stepped patterns satisfies the expressions:

$$(n1'-n0)s2=p\lambda 1, \text{ and}$$

$$(n2'-n0')s2=q\lambda 2,$$

where n1' and n2' denote refractive indices of an optical medium of the second phase compensator, respectively, with respect to the wavelengths $\lambda 1$ and $\lambda 2$, and n0 and n0' denote refractive indices of an air region of the second phase compensator, respectively, with respect to the wavelengths $\lambda 1$ and $\lambda 2$.

10. The compatible optical pickup of claim 7, wherein the second optical disc is a DVD family optical disc, the third optical disc is a CD family optical disc, and the first optical disc has a higher density than the second optical disc.

11. The compatible optical disc of claim 10, wherein the first optical disc has a smaller thickness than the second optical disc.

12. The compatible optical disc of claim 11, wherein the first optical disc has a thickness of about 0.1 mm.

13. The compatible optical disc of claim 11, wherein the objective lens has a numerical aperture of 0.7 or greater to be suitable for the first optical disc.

14. The compatible optical disc of claim 13, wherein the objective lens has a working distance of 0.7 mm or greater.

15. The compatible optical disc of claim 13, wherein the objective lens has a numerical aperture of 0.85.

16. The compatible optical disc of claim 13 further comprising:
  an aperture filter which alters an effective numerical aperture of the objective lens for at least one of the second and third light to be suitable for recording on and/or reproduction from at least one of the second and third optical discs.

17. The compatible optical disc of claim 16, wherein the aperture filter is integrally formed with at least one of the first and second phase compensators.

18. The compatible optical disc of claim 16, wherein the aperture filter is a wavelength-selective coating member or a holographic diffraction member which just transmits light incident through a center portion of the aperture filter and selectively hinders proceeding of light incident through an outer portion of the aperture filter depending on the wavelength of the incident light.

19. The compatible optical disc of claim 7, wherein the first light is light of a blue-violet wavelength region, the second light is light of a red wavelength region, and the third light is light of an infrared wavelength region.

20. The compatible optical disc of claim 8, wherein the first light is light of a blue-violet wavelength region, the second light is light of a red wavelength region, and the third light is light of an infrared wavelength region.

21. The compatible optical disc of claim 9, wherein the first light is light of a blue-violet wavelength region, the second light is light of a red wavelength region, and the third light is light of an infrared wavelength region.

22. The compatible optical disc of claim 19, wherein the wavelength $\lambda 1$ is about 400–410 nm, the wavelength $\lambda 2$ is about 635 nm or about 650 nm, and the wavelength $\lambda 3$ is about 780 nm.

23. The compatible optical disc of claim 20, wherein the wavelength $\lambda 1$ is about 400–410 nm, the wavelength $\lambda 2$ is about 635 nm or about 650 nm, and the wavelength $\lambda 3$ is about 780 nm.

24. The compatible optical disc of claim 21, wherein the wavelength $\lambda 1$ is about 400–410 nm, the wavelength $\lambda 2$ is about 635 nm or about 650 nm, and the wavelength $\lambda 3$ is about 780 nm.

25. An optical pickup, comprising:
a light unit which emits light along an optical axis;
an objective lens which focuses the light on a recording surface of a recording medium, wherein the objective lens is arranged on the optical axis and optimized to minimize aberration in focusing the light on the recording medium if the light has a first predetermined wavelength and the recording surface is positioned at a first predetermined distance from the objective lens;
a first phase compensator, disposed on the optical axis, which alters a phase of the light to correct for spherical and/or chromatic aberration if the light has a second predetermined wavelength and the recording surface is positioned at a second predetermined distance from the objective lens; and
a second phase compensator, disposed on the optical axis, which alters the phase of the light to correct for spherical and/or chromatic aberration if the light has a third predetermined wavelength and the recording surface is positioned at a third predetermined distance from the objective lens, wherein:
the first, second and third wavelengths correspond to light in blue-violet, red and infrared regions;
if the light has the first predetermined wavelength, the first and second phase compensators pass the light without phase alteration;
if the light has the third predetermined wavelength, the first phase compensator passes the light without phase alteration; and if the light has the second predetermined wavelength, the second phase compensator passes the light without phase alteration.

26. An optical pickup, comprising:
a light unit which emits light along an optical axis;
an objective lens which focuses the light on a recording surface of a recording medium, wherein the objective lens is arranged on the optical axis and optimized to minimize aberration in focusing the light on the recording medium if the light has a first predetermined wavelength and the recording surface is positioned at a first predetermined distance from the objective lens;
a first phase compensator, disposed on the optical axis, which alters a phase of the light to correct for spherical and/or chromatic aberration if the light has a second predetermined wavelength and the recording surface is positioned at a second predetermined distance from the objective lens; and
a second phase compensator, disposed on the optical axis, which alters the phase of the light to correct for spherical and/or chromatic aberration if the light has a third predetermined wavelength and the recording surface is positioned at a third predetermined distance from the objective lens, wherein:
the first, second and third wavelengths correspond to light in blue-violet, red and infrared regions, and
each of the first and second phase compensators is formed of a plurality of phase compensation regions which are mutually offset along the optical axis by predetermined steps.

27. The optical pickup of claim 26, wherein a number of steps of the first phase compensator is four.

28. An optical pickup, comprising:
a light unit which emits light along an optical axis;
an objective lens which focuses the light on a recording surface of a recording medium, wherein the objective lens is arranged on the optical axis and optimized to minimize aberration in focusing the light on the recording medium if the light has a first predetermined wavelength and the recording surface is positioned at a first predetermined distance from the objective lens;
a first phase compensator, disposed on the optical axis, which alters a phase of the light to correct for spherical and/or chromatic aberration if the light has a second predetermined wavelength and the recording surface is positioned at a second predetermined distance from the objective lens; and
a second phase compensator, disposed on the optical axis, which alters the phase of the light to correct for spherical and/or chromatic aberration if the light has a third predetermined wavelength and the recording surface is positioned at a third predetermined distance from the objective lens, wherein:
if the light has the first predetermined wavelength, the first and second phase compensators pass the light without phase alteration,
if the light has the third predetermined wavelength, the first phase compensator passes the light without phase alteration,
if the light has the second predetermined wavelength, the second phase compensator passes the light without phase alteration,
each of the first and second phase compensators is formed of a plurality of phase compensation regions which are mutually offset along the optical axis by predetermined steps, and a number of steps of the second phase compensator is three.

29. An optical pickup, comprising:
a light unit which emits light having a wavelength selectable from among a plurality of wavelengths;
an objective lens which focuses the light on a recording surface of a recording medium; and
a plurality of phase compensators interposed between the light unit and the objective lens, wherein:
each of the phase compensators induces a phase difference in light having one of the plurality of wavelengths, wherein the induced phase difference is not an integer multiple of the wavelength of the light having the one wavelength;
each of the phase compensators induces another phase difference in light having another of the plurality of wavelengths, wherein the another induced phase difference is about an integer multiple of the light having the another of the plurality of wavelengths; and
a number of the plurality of wavelengths is at least three including light corresponding to blue-violet, red, and infrared regions.

30. An optical pickup, comprising:
a light unit which emits light having a wavelength selectable from among a plurality of wavelengths;
an objective lens which focuses the light on a recording surface of a recording medium; and
a plurality of phase compensators interposed between the light unit and the objective lens, wherein:
each of the phase compensators induces a phase difference in light having one of the plurality of wavelengths, wherein the induced phase difference is not an integer multiple of the wavelength of the light having the one wavelength,
each of the phase compensators induces another phase difference in light having another of the plurality of wavelengths, wherein the another induced phase difference is about an integer multiple of the light having the another of the plurality of wavelengths, and
the light having the one of the plurality of wavelengths is an infrared light and the light having the another of the plurality of wavelengths is one of a red light and a blue-violet light.

31. An optical pickup, comprising:
a light unit which emits light along an optical axis, the light having a wavelength selectable from among a plurality of wavelengths;
an objective lens disposed on the optical axis, the objective lens focusing the light on a recording surface of a recording medium; and
a plurality of phase compensators interposed between the light unit and the objective lens, each of the phase compensators comprising an optical medium having a plurality of stepped surfaces formed transverse to the optical axis, wherein a step size between adjacent ones of the plurality of stepped surfaces satisfies expressions:

$(n_A - n0)s = m\lambda_A$, and $(n_B - n0_B)s = n\lambda_B$, where $n_A$ and $n_B$ denote refractive indices of the optical medium with respect to light having wavelengths $\lambda_A$ and $\lambda_B$, respectively, $n0$ and $n0_B$ denote refractive indices of an air region of each phase compensator with respect to the wavelengths $\lambda_A$ and $\lambda_B$, respectively, m and n are values in a range including (j−0.07) and (j+0.07) where j is an integer, and $\lambda_B$ is greater than $\lambda_A$.

32. The optical pickup of claim 31, wherein the wavelength of $\lambda_B$ corresponds to a light having a wavelength in an infrared range and $\lambda_A$ corresponds to light having a wavelength in one of a red light range and a blue-violet range.

33. The optical pickup of claim 31, wherein the wavelength of $\lambda_B$ corresponds to light having a wavelength in one of an infrared range and a red light range and $\lambda_A$ corresponds to light having a wavelength in a blue-violet range.

34. An optical system compatible with first, second and third types of optical discs, the optical system comprising:
an objective lens which focuses light, wherein the objective lens is optimized to minimize optical aberrations if the light has a first predetermined wavelength and the light is focused on the first type of disc;
a first phase compensator, which alters a phase of the light if the light has a second predetermined wavelength and the light is focused on the second type of optical disc; and
a second phase compensator, which alters the phase of the light if the light has a third predetermined wavelength and the light is focused on the third type of optical disc; wherein
the first and second phase compensators are positioned on a same optical axis.

35. An optical system compatible with first, second and third types of optical discs, the optical system comprising:
an objective lens which focuses light, wherein the objective lens is optimized to minimize optical aberrations if the light has a first predetermined wavelength and the light is focused on the first type of disc;
a first phase compensator, which alters a phase of the light if the light has a second predetermined wavelength and the light is focused on the second type of optical disc; and
a second phase compensator, which alters the phase of the light if the light has a third predetermined wavelength and the light is focused on the third type of optical disc, wherein:
each of the first and second phase compensators comprises an optical medium having a plurality of surfaces disposed transverse to an optical axis of the objective lens, wherein each respective surface alters the phase of the light according to a displacement of the respective surface from the optical axis.

36. The optical system of claim 35, wherein each of the plurality of surfaces is displaced along the optical axis from another of the plurality of surfaces by a predetermined step distance.

* * * * *

UNITED STATES PATENT AND TRADEMARK OFFICE
CERTIFICATE OF CORRECTION

PATENT NO.        : 7,180,846 B2
APPLICATION NO.   : 10/284415
DATED             : February 20, 2007
INVENTOR(S)       : Tae-kyung Kim et al.

It is certified that error appears in the above-identified patent and that said Letters Patent is hereby corrected as shown below:

Column 18, lines 52, 55, 57, 60, 62, 64 and
Column 19, lines 4, 7, 14, 18, 22, 26, 30, 34
    change "disc" to --pickup--

Column 22, line 32
    insert --:-- after "wherein"

Signed and Sealed this

Third Day of July, 2007

JON W. DUDAS
*Director of the United States Patent and Trademark Office*